United States Patent

[11] 3,600,075

[72] Inventor Alfred Winkler
 Munich, Germany
[21] Appl. No. 12,205
[22] Filed Feb. 19, 1970
[45] Patented Aug. 17, 1971
[73] Assignee Agfa-Gevaert Aktiengesellschaft
 Leverkusen, Germany
[32] Priority Feb. 21, 1969
[33] Germany
[31] G 69 06 842

[54] PHOTOGRAPHIC APPARATUS WITH
 DIAPHRAGM-ACTUATED RELEASE
 14 Claims, 4 Drawing Figs.
[52] U.S. Cl. ........................................... 352/244,
 200/172 A
[51] Int. Cl. .................................................. G03b 17/00,
 H01h 3/12
[50] Field of Search ........................................... 352/243,
 244, 174, 178, 95; 200/172 A

[56] References Cited
 UNITED STATES PATENTS
2,984,726 5/1961 Roeser .......................... 200/172 A
2,949,838 8/1960 Skalabrin ..................... 352/178

Primary Examiner—S. Clement Swisher
Attorney—Michael S. Striker

ABSTRACT: A motion picture camera wherein the body or the pistol grip handle supports an adjustable carrier for a deformable diaphragm which acts as a trigger to close a switch or to transmit motion to a mechanical camera release. The carrier is reciprocable with reference to the body or handle in parallelism with the optical axis of the objective or is mounted on a universal joint so that the diaphragm is movable to a position in which it is readily accessible to a finger on the hand which grips the handle.

PATENTED AUG 17 1971

3,600,075

INVENTOR.
ALFRED WINKLER

BY

*Michael S. Striker*
Attorney

PHOTOGRAPHIC APPARATUS WITH DIAPHRAGM-ACTUATED RELEASE

BACKGROUND OF THE INVENTION

The present invention relates to photographic apparatus in general and more particularly to improvements in operating means or releases for still cameras or motion picture cameras, especially for motion picture cameras.

It is already known to utilize a deformable diaphragm as a trigger to close an electric switch or to move a mechanical part of a camera release. An advantage of such diaphragm is that a minimal force is necessary to start the motor of a motion picture camera or still camera as well as that a minimal displacement of the diaphragm suffices to close a switch or to effect necessary displacement of a mechanical starter for the motor. As a rule, the diaphragm is flush with a portion of the camera body so that it does not extend beyond the outline of such body. Problems arise when a camera release embodying a diaphragm is to be used on cameras whose housing includes a pistol grip or another type of handle, especially a handle which extends forwardly and downwardly from the camera body. It was found that a diaphragm which is mounted directly in the wall of a pistol grip handle is often hard to reach.

SUMMARY OF THE INVENTION

An object of the invention is to provide a photographic apparatus with operating means which includes a deformable diaphragm and to mount the diaphragm on the housing of the photographic apparatus in such a way that the diaphragm is readily accessible when the apparatus is in use and the operator wishes to make one or more exposures.

Another object of the invention is to provide a photographic apparatus whose housing includes a pistol grip or another type of handle and wherein the diaphragm of the operating means is mounted or adapted to be mounted in such a way that it can be readily reached by at least one finger of the hand which grips the handle so that the other hand remains free to manipulate other components of the apparatus.

A further object of the invention is to provide a novel carrier structure for the operating means in a still camera or motion picture camera, especially in a motion picture camera with downwardly and forwardly extending pistol grip handle.

An additional object of the invention is to provide a photographic apparatus wherein the operating means can be moved between a large number of positions so that its diaphragm can be located where it is readily accessible to the user of the apparatus.

The invention is embodied in a photographic apparatus, particularly in a motion picture camera, which comprises a housing (including a camera body and preferably a handle which extends from the body), carrier means supported by and movable relative to the housing between a plurality of positions, and camera operating means including a deformable diaphragm mounted on the carrier means. The carrier means can be mounted in the body or in the handle for reciprocatory movement in parallelism with the optical axis of the objective, or it may be mounted on a universal joint which is installed in or attached to the body or to the handle. Fastener means is preferably provided for releasably securing the carrier means to the housing.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
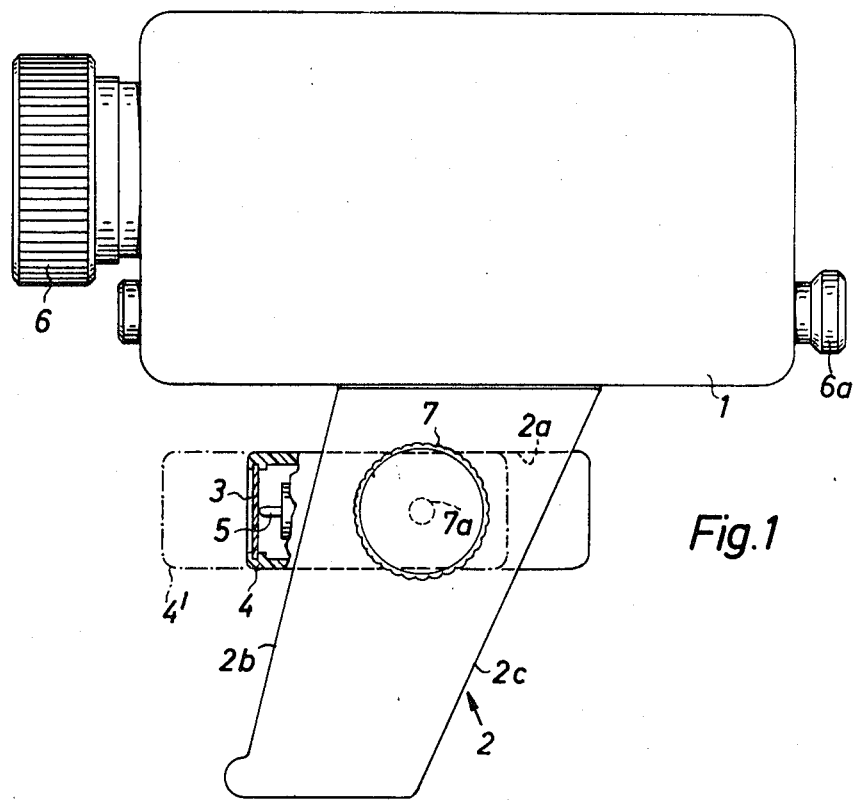
FIG. 1 is a schematic side elevational view of a motion picture camera wherein the carrier means is mounted on the handle of the camera housing and is movable in parallelism with the optical axis of the objective.

FIG. 1 illustrates a motion picture camera having a housing which includes a camera body 1 and a pistol grip handle 2 whose front and rear sides 2b, 2c extend forwardly and downwardly from the underside of the body 1. The picture taking objective is shown at 6 and the viewfinder at 6a. In accordance with a feature of the invention, the handle 2 is provided with a channel 2a which is parallel to the optical axis of the objective and accommodates a reciprocable carrier structure 4 which is a substantially block-shaped casing and can be pushed or pulled by hand between an infinite number of positions, e.g., between the solid-line position and the phantom-line position 4'. The front wall of the casing 4 is formed with a window which accommodates a deformable diaphragm or trigger 3 located in front of a displaceable member 5 which can constitute the movable contact of a normally open electric switch serving to start the motor in the body 1. The diaphragm 3 and the device including the member 5 together form a camera operating means which starts the motor and/or initiates one or more further operations in response to finger pressure on the outer side of the diaphragm 3. Such pressure can be exerted by a finger of the hand which grips the handle 2. Once the casing 4 is moved to an optimum position, it can be releasably fixed or locked in such position by a fastener 7 here shown as a knurled wheel having a stem 7a which meshes with the handle 2 and can engage the adjacent side face of the casing 4 in the channel 2a. It is clear that the channel 2a can be replaced with a recess provided in an outer side of the handle 2. Also, the channel 2a need not extend in exact parallelism with the axis of the objective 6.

It was found that a diaphragm which is placed forwardly of the front side 2b of the handle 2 is more readily accessible to one or more fingers of the hand which grips the handle than a diaphragm which is installed directly in the front side 2b.

The connection between the electric circuit in the body 1 and the operating means in the casing or carrier structure 4 (provided that the member 5 forms part of an electric switch) can be established by means of fixed contacts provided in the channel 2a and sliding contacts provided on the casing 4 and engaging the fixed contacts in each selected position of the casing. If the member 5 forms part of a purely mechanical connection with the motor or shutter in the body 1, it may constitute the axially movable core of a Bowden wire or the like.

Figure 2:
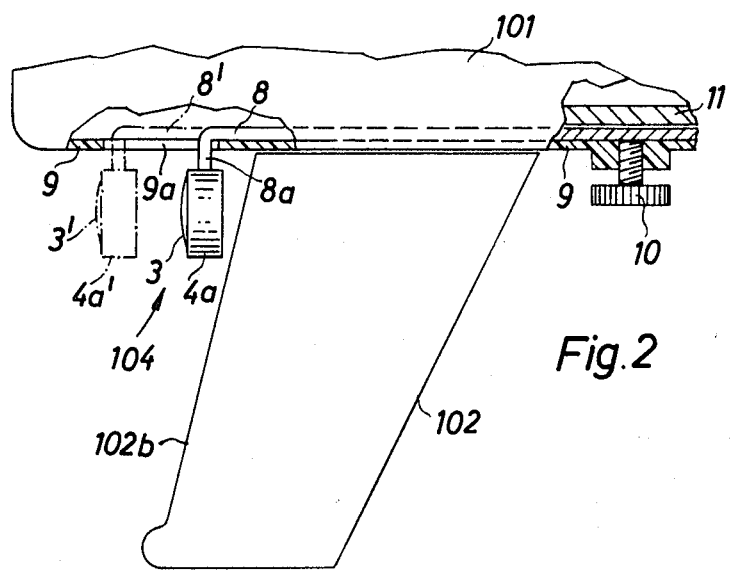
FIG. 2 is an enlarged fragmentary side elevational view of a second motion picture camera wherein the carrier means is mounted directly in the camera body.

In the embodiment of FIG. 2, the camera body 101 is provided at its underside with guide means or ways 11 for a carrier structure 104 which includes an elongated rail 8 having a downwardly bent front end portion 8a supporting a capsule 4a for a diaphragm 3 and a motion receiving member (not shown) in the interior of the capsule. The bottom wall 9 of the body 101 has an elongated slot 9a through which the portion 8a of the rail 8 extends in front of the front side 102b of the pistol grip handle 102. A fastener 10 is threadedly connected with the bottom wall 9 and can engage the rear portion of the rail 8 to hold the capsule 4a and the diaphragm 3 in a position which is most convenient to the user of the camera. The foremost positions of the capsule 4a, diaphragm 3 and rail 8 are indicated by phantom lines, as at 4a', 3' and 8'. The rail 8 is reciprocable in substantial parallelism with the optical axis of the picture taking objective, not shown.

Figure 3:
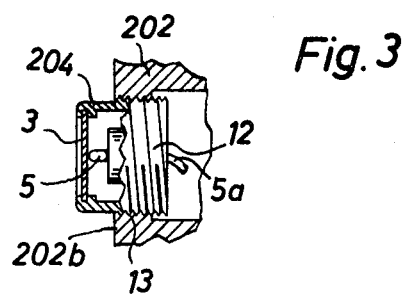
FIG. 3 is a fragmentary sectional view of a handle which meshes with externally threaded carrier means.

FIG. 3 illustrates a portion of a pistol grip handle 202 whose front side 202b is provided with a tapped bore 13 for the externally threaded portion 12 of a carrier structure 204 containing a diaphragm 3 and a displaceable member 5. The distance between the diaphragm 3 and the front side 202b of the handle 202 can be changed in response to rotation of the carrier structure 204. If the member 5 forms part of an electric switch, the latter can be connected with the other parts of the electric circuit in the camera housing by flexible conductors in a sheath 5a.

The carrier structure 204 can be threadedly connected with the body of a camera housing, for example, directly below the picture taking objective.

Figure 4:
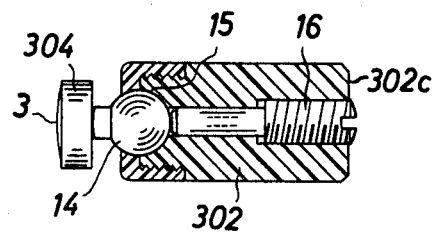
FIG. 4 is a fragmentary sectional view of a handle which includes a universal joint for the carrier means.

FIG. 4 shows a portion of a handle 302 which supports a universal joint for a capsulelike carrier structure 304 containing a deformable diaphragm 3. The joint comprises a socket 15 in the front side 302b of the handle 302 and a ball 14 which is turnable in the socket 15 unless prevented by the tip of a threaded fastener 16 which meshes with the handle 302 and can engage with or be disengaged from the ball. The universal joint enables the user to move the carrier structure 304 to any one of an infinite number of positions relative to handle 302. The head of the fastener 16 can be reached at the rear side 302c of the handle 302. The joint can also be installed in the body of a motion picture camera. It is further clear that at least some of the carrier structures shown in FIGS. 1 to 4 can be used with advantage in or on still cameras. For example, the structure shown in FIG. 3 or 4 can be readily incorporated in still cameras.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What I claim as new and desired to be protected by Letters Patent is set forth in the appended claims:

1. In a photographic apparatus, a combination comprising a housing; carrier means supported by and movable relative to said housing between a plurality of positions; and camera operating means including a deformable diaphragm mounted in said carrier means.

2. A combination as defined in claim 1, wherein said operating means further comprises a member which is displaceable in response to deformation of said diaphragm.

3. A combination as defined in claim 2, wherein said displaceable member forms part of an electric switch.

4. A combination as defined in claim 1, wherein said housing comprises a camera body and a handle extending from said body, and further comprising picture taking objective means mounted on said body, said carrier means being supported by and being movable with reference to said handle in substantial parallelism with the axis of said objective means.

5. A combination as defined in claim 4, further comprising fastener means releasably securing said carrier means to said handle.

6. A combination as defined in claim 1, wherein said housing comprises a camera body and further comprising picture taking objective means mounted on said body, said carrier means being supported by and being reciprocable relative to said body in substantial parallelism with the axis of said objective means.

7. A combination as defined in claim 6, wherein said carrier means comprises an elongated rail and said body is provided with guide means for said rail, and further comprising fastener means releasably securing said rail to said body.

8. A combination as defined in claim 6, wherein said housing further comprises a handle extending from said body and having a front side facing the subject when the camera is ready to make an exposure, said operating means being mounted on said carrier means forwardly of said front side of said handle so that the diaphragm is accessible to at least one finger of the hand which grips the handle.

9. A combination as defined in claim 8, wherein said carrier means comprises an elongated rail which is reciprocable in guide means provided therefor in said body, said rail having a bent over front end portion supporting said operating means.

10. A combination as defined in claim 1, wherein said housing and said carrier means are provided with mating threads and said carrier means is movable between said plurality of positions in response to rotation thereof with reference to said housing.

11. A combination as defined in claim 10, wherein said housing comprises a camera body and a handle extending from said body, said carrier means being in threaded engagement with said handle.

12. A combination as defined in claim 1, further comprising a universal joint connecting said carrier means to said housing.

13. A combination as defined in claim 1, wherein said universal joint is a ball and socket joint.

14. A combination as defined in claim 1, wherein said apparatus is a motion picture camera and said housing comprises a camera body and a handle extending downwardly and forwardly from said body, said carrier means being supported by said housing in such a way that said diaphragm is accessible to at least one finger of the hand which grasps said handle.